Nov. 27, 1951 — R. E. GEARHART — 2,576,454
SCREW HOLDING SCREW DRIVER
Filed Nov. 12, 1947
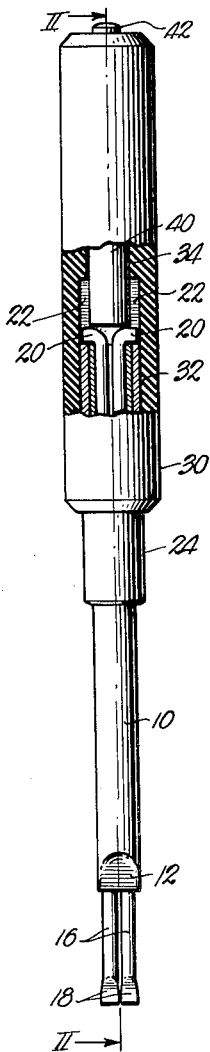
Fig. 1.
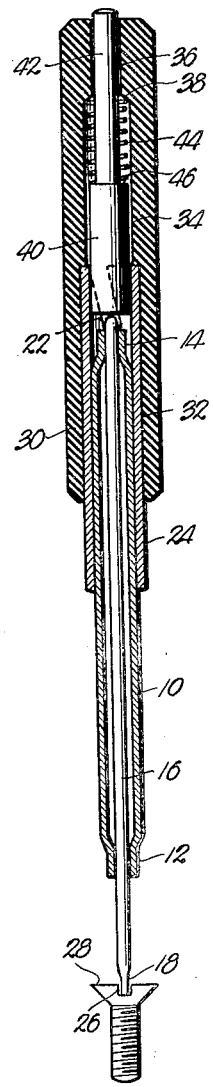
Fig. 2.
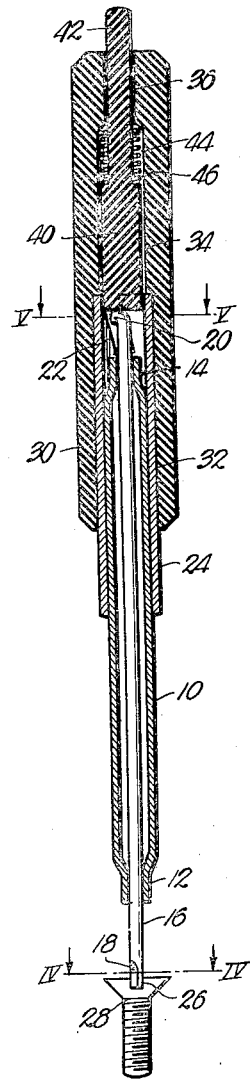
Fig. 3.
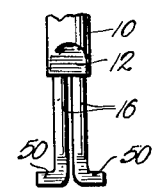
Fig. 6.
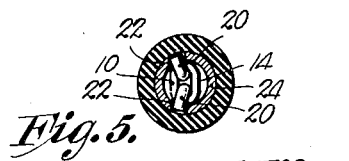
Fig. 4.   Fig. 5.
INVENTOR.
Roy E. Gearhart
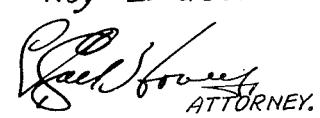
BY
ATTORNEY.

Patented Nov. 27, 1951

2,576,454

UNITED STATES PATENT OFFICE 2,576,454

SCREW HOLDING SCREW DRIVER

Roy E. Gearhart, Kansas City, Mo., assignor to Herbert H. Twente, Independence, Mo.

Application November 12, 1947, Serial No. 785,314

7 Claims. (Cl. 145—50)

This invention relates to hand tools and particularly to improvements in screw holders of the type disclosed in my copending applications, Serial Nos. 669,312, now abandoned, and 689,691, issued November 21, 1950 as Patent No. 2,530,763.

The primary aim of the present invention is to provide a screw holder constructed to firmly grip a screw and wherein is embodied simple mechanism for releasing the screw.

It is a further object of this invention to provide a versatile tool which can be used to grip the common slotted screw head, the "Phillips" type screw, or, with slight modifications, a nut provided with a screw driver slot.

A further object of the invention is to provide a simple tool of the above character which can be manufactured at low cost.

Other objects of the invention will become apparent during the course of the following specification, reference being had to the accompanying drawings, wherein:

Figure 1 is a side elevational view of a screw holder constructed in accordance with my invention, a portion being broken away to disclose the inter-engaged relation of the shank and gripping members.

Fig. 2 is a central longitudinal sectional view taken on the line II—II of Fig. 1 with the gripping members in normal inoperative position.

Figure 3 is a similar sectional view showing the tool moved to screw-holding position.

Fig. 4 is a cross-section taken on the line IV—IV of Fig. 3.

Fig. 5 is a cross-section taken on the line V—V of Fig. 3, and

Fig. 6 is a fragmentary elevational view of a modified form of gripping member.

Referring in more detail to the drawings the numeral 10 designates a hollow shank preferably flattened at each end as at 12 and 14 respectively to form guides for a pair of gripping members 16 arranged in side-by-side relation in the shank. The outer ends of the gripping members are provided with screw-engaging blade portions 18 and the opposite ends of said members are bent laterally to form projections 20 for riding in a pair of opposed and angularly disposed slots 22 of a sleeve 24 which is firmly mounted on shank 10 and in effect comprises a part of said shank. One end of sleeve 24 extends beyond the inner end of shank 10 a distance substantially equal to the depth of the slots 22.

Thus when the gripping members 16 are inserted in the slot 26 of a screw 28 as shown in Fig. 2, and downward pressure is exerted on shank 10, the lateral ends 20 each ride upwardly in a slot 22 but because of the angular relation of the slots in sleeve 24, these members 16 are caused to partially rotate as shown in Fig. 3, thereby gripping the screw head securely.

To further facilitate operation of the tool, a hollow handle 30 is provided having a relatively large bore 32 for snugly receiving one end of sleeve 24. A smaller continuation 34 of the bore terminates in a further reduced opening 36 to form a shoulder 38. Seated within portion 34 of the bore is the head 40 of a release pin 42, the head resting against the lateral ends 20 of the gripping members and being retained in that position by a light spring 44. This spring is coiled over the pin 42 and its opposite ends respectively bear against a shoulder 46 of the release pin and the shoulder 38.

From the foregoing it will be apparent that a tool of extremely simple design has been provided which will securely grip screws though the width of the screw slots vary greatly. The length and angle of the slots 22 determine the amount of rotative movement of the gripping members 16. It has been found in practice that this rotative movement of each blade should be not less than forty-five degrees. Since these blades move in opposite directions as shown in Fig. 4, they tend to hold a screw in direct alignment with the longitudinal axis of the holder. This is an important advantage since it facilitates the starting of a screw into a threaded opening. The fact that the blades 18 are duplicates makes possible the adaptation of this tool for use in holding the "Phillips" type screw. For the latter purpose however, it is preferable to use blades of less width.

In many instances, as for example in switch boxes and meters, binding nuts are often used having screw driver slots. Because of interfering wires, such nuts are extremely difficult to reach for application or removal. By modifying the gripping blades as shown at 50 in Fig. 6, the present tool can be used for holding such nuts very securely.

The tension of spring 44 should be only sufficient to normally hold the gripping members at their outermost limit of travel as shown in Fig. 2. When the gripping members have been forced to screw-engaging position as illustrated in Fig. 3, the twisting force set up in the gripping members will retain them in this position until the screw has either been forcibly withdrawn from the blades or the release pin 42 has been pushed inwardly to return the gripping members to inoperative condition.

A tool constructed in accordance with this invention can be made in almost limitless lengths and sizes and while it is possible that modifications other than those shown might be made without departing from the spirit of this invention, it is desired to be limited only by the scope of the appended claims.

Having thus described the invention, what is claimed as new and desired to be secured by Letters Patent is:

1. A screw holder comprising a hollow shank, said shank being open at one end and having a handle portion on its opposite end; a pair of gripping members in side-by-side relation to each other in the shank and mounted for sliding and partial rotative movement in the shank, said gripping members each having a blade portion on one end extending through the open end of the shank for entering a screw slot, said blade portions being spaced substantially the same distance from the open end of the shank; and interengaging means on said gripping members and the shank to effect partial relative rotation of the members for gripping a screw in response to sliding movement of said members in said shank.

2. A screw holder comprising a hollow shank, said shank being open at one end and having a handle portion on its opposite end; a pair of gripping members in side-by-side relation to each other in the shank and mounted for sliding and partial rotative movement in the shank, said gripping members each having a blade portion on one end extending through the open end of the shank for entering a screw slot, said blade portions being spaced substantially the same distance from the open end of the shank; and interengaging means on said gripping members and the shank to effect partial relative rotation of the members in opposite directions for gripping a screw in response to sliding movement of said members in said shank.

3. A screw holder comprising a hollow shank, said shank being open at one end and having a handle portion on its opposite end; a pair of gripping members in side-by-side relation to each other in said shank and mounted for sliding and partial rotative movement in the shank, said gripping members each having a blade portion on one end extending through the open end of the shank for entering a screw slot, said blade portions being spaced substantially the same distance from the open end of the shank; and interengaging means on said gripping members and the shank to effect partial relative rotation of the members for gripping a screw in response to sliding movement of said members in said shank, said interengaging means comprising a pair of opposed and angularly disposed slots in the shank and a lateral projection on each of the gripping members, each slot being engaged by the projection of one of the two gripping members.

4. A screw holder comprising an open-ended hollow shank; a sleeve on said shank having one end extending beyond said shank, said end having a pair of opposed and angularly disposed slots therein; a pair of gripping members in side-by-side relation to each other in said shank and mounted for sliding and partial rotative movement in the shank, said gripping members having their opposite ends projecting beyond the ends of the shank; a lateral projection on one end of each of the gripping members, each of said slots being engaged by the projection of one of the two gripping members to effect partial relative rotative movement of the gripping members in response to sliding movement of said members in the shank; and a screw-engaging blade portion on the opposite end of each of the gripping members, said blade portions being substantially coextensive.

5. A screw holder comprising a hollow shank having guide portions on each end; a pair of gripping members extending through said shank for sliding and partial rotative movement in said guide portions; a sleeve on said shank having one end extending beyond the shank, said end having a pair of opposed and angularly disposed slots therein; a lateral projection on one end of each of the gripping members, each of said slots being engaged by the projection of one of the two gripping members to effect partial relative rotative movement of the gripping members in response to sliding movement of said members in the shank; and a screw-engaging blade portion on the opposite end of each of the gripping members, said blade portions being substantially coextensive.

6. A screw holder comprising a hollow shank, said shank being open at one end and having a handle portion on its opposite end; a pair of gripping members in side-by-side relation to each other in the shank and mounted for sliding and partial rotative movement in the shank, said gripping members each having a blade portion on one end extending through the open end of the shank for entering a screw slot, said blade portions being spaced substantially the same distance from the open end of the shank; interengaging means on said gripping members and the shank to effect partial relative rotation of the members in one direction for gripping a screw in response to sliding movement of said members in said shank; and a pin in the handle portion for moving said members in the opposite direction to release the screw.

7. A screw holder comprising an open-ended hollow shank; a sleeve on said shank having one end extending beyond said shank, said end having a pair of opposed and angularly disposed slots therein; a pair of gripping members in parallel relation to each other in said shank and mounted for sliding and partial rotative movement in the shank, said gripping members having their opposite ends projecting beyond the ends of the shank; a lateral projection on one end of each of the gripping members, each of said slots being engaged by the projection of one of the two gripping members to effect partial relative rotative movement of the gripping members in response to sliding movement of said members in the shank; a screw-engaging blade portion on the opposite end of each of the gripping members, said blade portions being substantially coextensive; and a spring-loaded pin bearing against said projections for normally urging the projections toward the base of said slot to hold said blade portions in aligned relation with each other.

ROY E. GEARHART.

REFERENCES CITED

The following references are of record in the file of this patent:

UNITED STATES PATENTS

| Number | Name | Date |
|---|---|---|
| 2,040,723 | Adison | May 12, 1936 |
| 2,324,153 | Hagness | July 13, 1943 |